Nov. 26, 1957 — R. H. ANDERSON ET AL — 2,814,482
AIRCRAFT LANDING GEAR SHOCK STRUT
Filed June 15, 1954 — 3 Sheets-Sheet 1

Roy H. Anderson &
Alfred B. Youngs
INVENTORS.

BY *James M. Clark*

ATTORNEY.

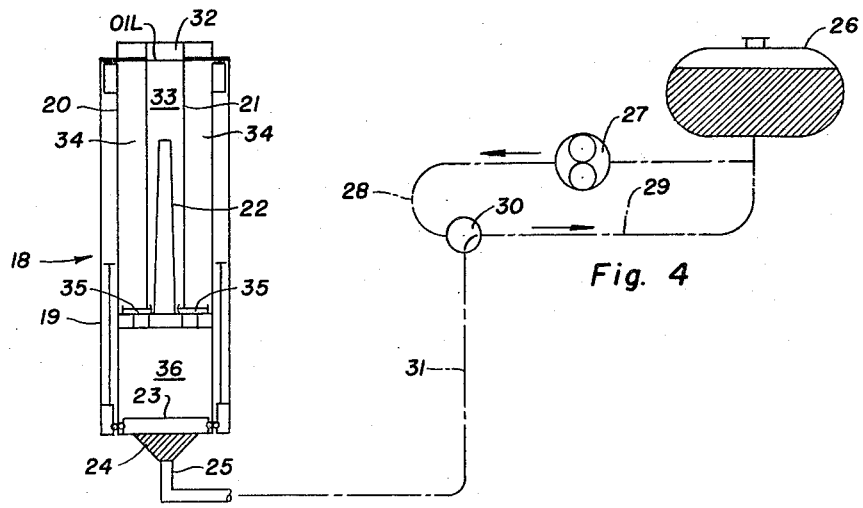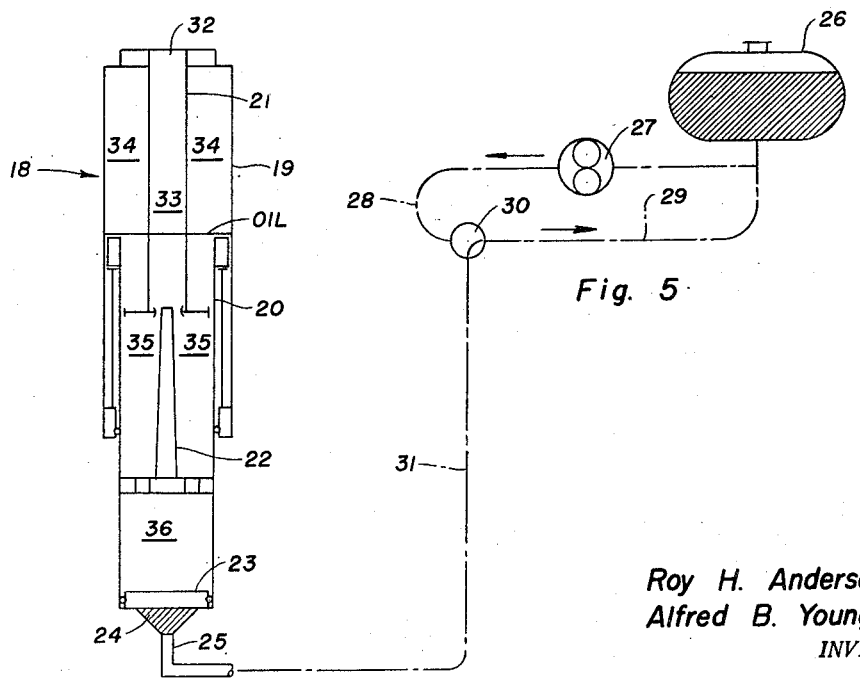

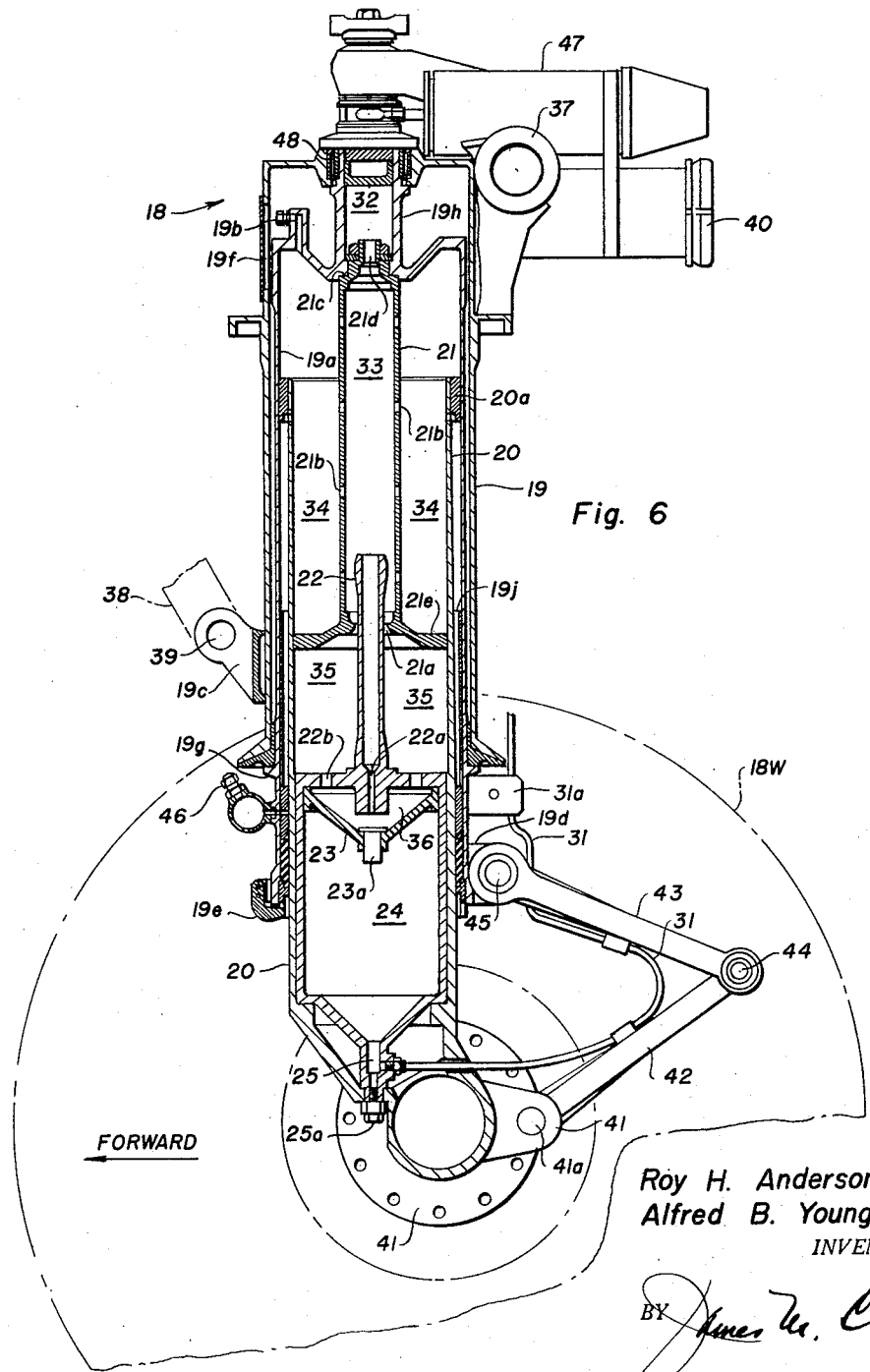

2,814,482
AIRCRAFT LANDING GEAR SHOCK STRUT

Roy H. Anderson, Bellevue, and Alfred B. Youngs, Seattle, Wash., assignors to Boeing Airplane Company, a corporation of Delaware Application June 15, 1954, Serial No. 436,835

1 Claim. (Cl. 267—64)

The present invention relates generally to landing gears and more particularly to improved shock absorbing struts for the landing gears for aircraft and the like wherein the compression ratios and shock absorbing characteristics of the struts may be controlled and varied during flight.

Modern high speed jet aircraft have relatively high touchdown speeds upon landing and the landing gears for such aircraft are frequently of the bicycle type wherein one landing gear unit is spaced well forward of the center of gravity of the airplane and a similar unit is usually equally spaced aft of the center of gravity. Each of these landing gear units or assemblies must of necessity withstand relatively high impact forces and since they have comparatively short struts for compactness and strength, they consequently absorb shock loads rather stiffly. These main landing gear units are usually supplemented by laterally disposed stabilizing units which may be supported from the wings, the engine nacelles or the jet pods.

In practice, the landing of an airplane of this type presents a major problem in that the stiff short forward strut resists the efforts of the pilot to depress the nose of the airplane to lower its angle of attack upon landing so as to decrease the lift and keep the airplane on the ground. Attempts to pitch the airplane nose down frequently results in a bounce which raises the nose causing the airplane to again become airborne. Repeated bouncing interferes with efficient braking and necessitates a relatively long runway in order to bring the airplane to a stop. Attempts to land the airplane on the front strut alone, so as to lower the angle of attack, have also resulted in undue bouncing and frequently in bouncing the aircraft completely off the runway.

The present invention is directed to a solution of this problem and comprises essentially a forward shock strut of a bicycle type landing gear arrangement which is so designed that when adjusted for landing it is softer and compressible to a greater extent than when adjusted for take-off or taxiing operations. When adjusted for landing, the forward shock strut assumes a shorter length when fully loaded thus having the effect of lowering the angle of attack of the wings and reducing the tendency of the airplane to inadvertently become airborne upon landing.

It is accordingly a major object of the present invention to provide a landing gear in which the landing characteristics of the forward gear are softer, or relatively more compactible than for take-off conditions, in order that the airplane may be landed more readily. A further object of this invention resides in the provision of an improved landing gear arrangement in which the objectionable tendency to bounce or become airborne during landing is minimized and reduced. A further object resides in an improved dual position shock absorbing oleo strut in which the strut is provided with a floating piston and an auxiliary chamber, such that when pressure fluid is admitted to the auxiliary chamber forcing the floating piston upwardly against a ported partition, the working volume of the strut is limited for take-off, whereas relieving the pressure below the floating piston permits an increase in the working volume causing the strut to shorten to a greater extent during landing and taxiing operations.

Other forms and advantages of the present invention will occur to those skilled in the art after reading the following description, taken in conjunction with the accompanying drawings, forming a part hereof, in which:

Fig. 4 is a similar view of the same with the strut adjusted for softness and fully compressed as in landing;

Fig. 5 is a similar view of the same in the fully extended position prior to a landing; and Fig. 6 is a detailed cross-sectional view of the improved shock absorbing strut.

Figure 1:
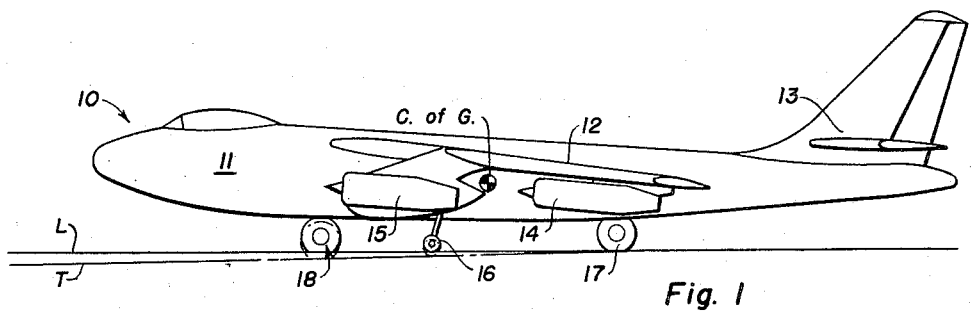
Fig. 1 is a side elevational view of a modern high speed jet aircraft to which a form of the improved landing gear has been applied.
Figure 2:
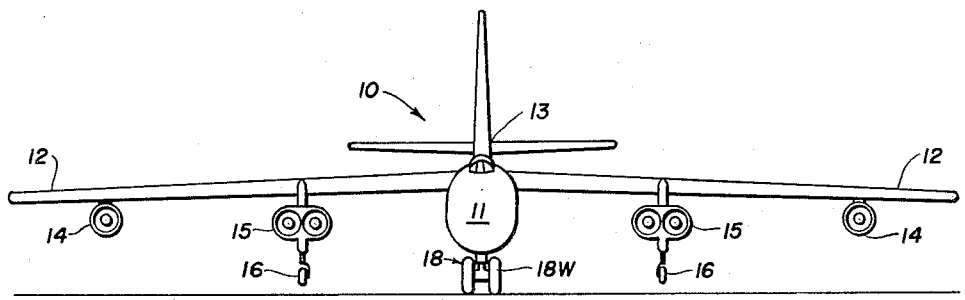
Fig. 2 is a front elevational view of the same.

Referring now to Figs. 1 and 2, the numeral 10 designates generally the overall arrangement of a high speed jet bomber aircraft having an elongated fuselage 11, laterally extending sweptback wings 12 and a tail group or empennage 13. The aircraft is propelled by a plurality of jet power plants suspended beneath the wing 12 comprising the single jet outboard units 14 and the twin-jet inboard units 15 suspended from the wing within suitable pods. Supplementary or stabilizing landing gear units 16 are preferably supported beneath the inboard jet engine groups 15 and the aircraft is supported during normal take-off, landing and taxiing operations by the main bicycle type landing gear units 17 and 18 disposed aft of and forward of the center of gravity of the aircraft, respectively. The forward main landing gear unit or assembly 18 may preferably include a pair of dual wheels 18W and is preferably of the improved type of the present invention whereby in Fig. 1 the attitude with respect to the ground line L (for the landing condition) is such that the landing gear unit 18 is adjusted for softness and is compressed to the maximum extent and the angle of attack of the wing 12 reduced such that the aircraft is prevented from becomnig airborne or bouncing unduly due to too much lift. It is also such that the characteristics of the forward landing gear assembly 18 may be adjusted to cause the same to be relatively stiff and elongated such that in the take-off attitude indicated by the ground line T the nose of the craft is pointed upwardly at a greater angle, as well as the angle of attack of the wings 12, to obtain greater lift and to facilitate take-off. For taxiing operations the landing gear is preferably returned to the readily compressed or soft condition used for landing operations.

Figure 3:
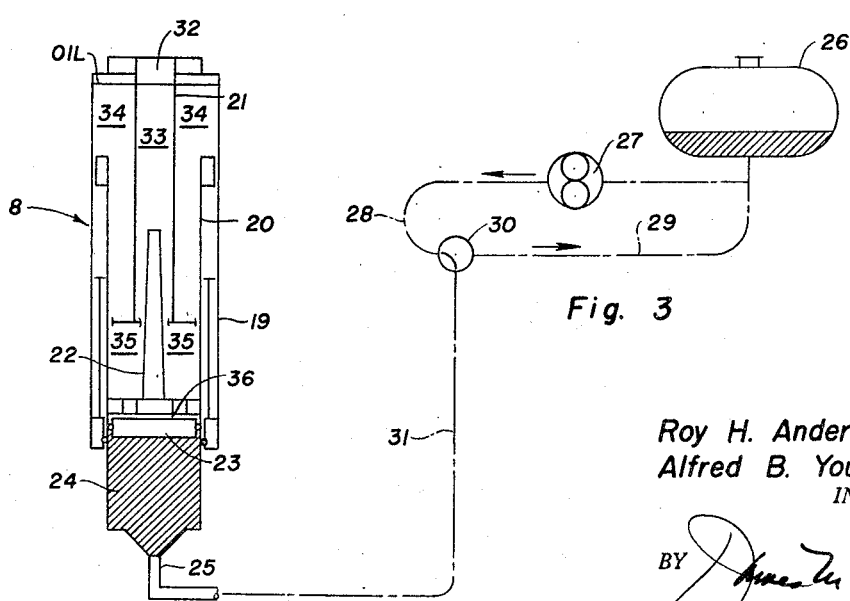
Fig. 3 is a diagrammatic view of the improved dual position shock absorbing strut in a condition adjusted for stiffness for take-off and the fluid system by which it is selectively controlled.

The essential elements of the improved landing gear strut are shown diagrammatically in Figs. 3 to 5, inclusive, and in detail in Fig. 6. In each of these figures the front oleo strut assembly 18 includes the cylinder element 19 which is fixedly supported from the aircraft in its operative position and the entire assembly is suitably retracted into the fuselage outlines during flight. Within the external fixed cylinder 19 there is reciprocably slidable the piston assembly 20 which telescopes externally of the orifice tube 21 and also has a centrally or axially disposed metering pin 22 which telescopes internally of the metering orifice tube 21. Suitable stops, to be more fully described below, are provided to limit the extended and compressed positions of the improved shock absorbing strut. The piston assembly 20 is also provided with a floating internal piston 23 which floats upon a controllable body of fluid within the lower auxiliary chamber 24, the volume of which may be selectively varied to obtain the desired shock absorbing characteristics.

These characteristics of the dual position shock absorbing strut 18 are controlled and obtained by the hydraulic system shown diagrammatically in Figs. 3, 4 and 5. At the bottom of the piston assembly 20, there is provided a fluid hydraulic connection 25 to the auxiliary variable volume chamber 24 receiving its fluid from the reservoir 26. A pump 27 is provided to draw the fluid from the reservoir 26 discharging the same into the high pressure line 28 and the fluid is returned to the reservoir through the return line 29. A two-way rotary type selector valve 30 is provided to direct hydraulic fluid under pressure from the discharge line 28 into the line 31 to the chamber 24 in the position shown in Fig. 3, or to permit lowering of the floating piston 23 and return of the fluid to the reservoir 26 in the position of the valve shown in Figs. 4 and 5.

Reference is now made to the detail sectional view of the dual position shock absorbing strut as shown in Fig. 6. As indicated above, the fixed portion of the landing gear strut comprises the outer cylinder 19 which in the normal operative position is fixed with respect to the aircraft and may be rotated upwardly and forwardly, or clockwise as viewed in Fig. 6, about the trunnion pivot 37 upon folding of the drag link 38 pivotally connected to the cylinder fitting 19c by the pivot pin 39 for retraction within the fuselage. Inside the outer cylinder 19 is the inner cylinder casing 19a which has a shouldered head fitting 19h at one end and a flange or boss 19g at its other end. The head fitting 19h and the boss 19g determine the axial position of the inner cylinder casing 19a with respect to the outer cylinder 19. The inner casing 19a, however, is coaxially rotatable within the outer cylinder 19 for purposes of steering the landing wheels 18W, this steering being accomplished by a pair of hydraulic steering cylinders 40 applying torque to upwardly extended portions of the head fitting 19h of the inner casing 19a journalled at 48 within the outer cylinder 19. The hydraulic steering cylinders 40 preferably also are arranged to provide shimmy damping of the landing wheels and a pair of centering springs suitably enclosed within the cylindrical housings 47 are also operatively attached to the inner casing 19a for resiliently maintaining the wheels 18W in their centered or longitudinally aligned positions.

As indicated above, there is axially disposed and fixedly suspended from the head fitting 19h of the inner casing 19a the orifice tube 21 having a lower transverse diaphragm 21e suitably orificed at 21a and having a plurality of openings 21b through the wall of its tubular portion. The upper end of the tube 21 is suitably shouldered at 21c for retention within the head fitting 19h and its upper end is provided with an axial opening at 21d for communication with the head chamber 32 within the head fitting 19h. The piston assembly 20 is provided at its upper end with an outer spacer ring 20a which slidingly reciprocates within the inner bore of the cylinder lining 19a, and in turn the transverse diaphragm 21e slidingly reciprocates within the bore of the piston 20. The axle 41 carrying the dual wheels 18W is rotatably mounted on the lower structure of the piston assembly 20. This axle or hub fitting 41 is provided with a pivotal mounting 41a to which the torsion links 42 and 43 are interconnected with the pivot 45 mounted upon the fitting 19d carried at the lower end of the cylinder casing 19a. The torsion links 42 and 43 are intermediately pivoted at 44 and prevent relative axial rotation between the piston assembly 20 and the cylinder casing 19a within which it slidingly reciprocates.

The flexible conduit 31 described above as supplying the hydraulic fluid to the auxiliary chamber 24 of the piston 20 is supported upon the cylinder casing 19a by the fitting 31a and extends down to and is connected to the fitting 25 at the bottom of the piston assembly 20. A suitable drain valve fitting 25a is provided for draining the hydraulic fluid from the auxiliary chamber 24 and a further drain valve fitting 23a is provided in the central depending portion of the floating piston 23 for draining the shock absorber fluid from within the chambers 32, 33, 34, 35 and 36 whenever it is desired to do so by removal of the valve 25a and the insertion of the necessary tool through the outlet connection at 25. The lower end of the cylinder casing 19a is provided with a suitable retainer ring 19e and an oil filler and pressure valve 46 is provided through the outer wall of the lower portion of the cylinder casing 19a which may preferably be charged with nitrogen to approximately 250 p. s. i. for pressurizing the O-ring seals to prevent their failure due to low oleo strut pressure. The main supply of oleo shock absorber fluid is inserted through the filler inlet connection 19b in the cylinder casing head portion 19h, access to which is provided by the door or cover plate 19f. The head chamber 32 is also preferably filled with nitrogen to fill the air space above the shock absorber oil or fluid and the shouldered portion of the head fitting 19h when engaged by the ring 20a of the piston 20 serves as the compressed position stop, whereas the edge 19j of the cylinder lining 19a serves as the extended position stop when engaged by the ring 20a.

It will, accordingly, be noted that the shock absorbing strut assembly is comprised of two main assemblies, namely the relatively fixed cylinder assembly 19 and the wheel-carrying piston assembly 20 which is slidingly reciprocable therein. The relatively fixed cylinder assembly is, however, composed of two major sub-assemblies, namely, the relatively fixed outer cylinder 19, which is supported from the aircraft upon the trunnion pivot 37 and by the drag link strut 38, and within which is rotationally supported in a coaxial relationship the inner casing 19a, to the lower end of which the wheel-carrying piston assembly 20 is articulated to rotate therewith about the main vertical axis of the strut assembly. It will also be noted that whereas the cylinder liner 19a rotates within the cylinder 19 it is restrained from reciprocating therein, but the piston assembly 20 is both reciprocable within the cylinder lining 19a in the axial direction and is also rotatable with the cylinder lining 19a, within and with respect to the relatively fixed cylinder 19.

In Fig. 3 the floating piston 23 has been extended to its uppermost position by the complete filling of the auxiliary chamber 24 by the hydraulic fluid from the reservoir 26. This gives the shock absorber strut assembly the relatively stiff characteristics such as are suitable for take-off and ground handling of the aircraft and as shown diagrammatically in this figure in a static position to provide in a specific embodiment of the device, a 12" stroke and a 40:1 total compression ratio with a 2:1 static compression ratio. In this condition in which the working volume of the oil or shock absorber fluid is limited by the upwardly disposed position of the floating piston, the oil acts as the compressed position stop when the strut is fully compressed.

In order to give the strut the desired soft or more readily compressible characteristics suitable for landing, the hydraulic fluid is withdrawn from the auxiliary chamber 24 into the reservoir 26 causing the floating piston 23 to drop to the bottom of the piston component to thereby increase the working volume of the oil and nitrogen or other gas within the strut and to permit the strut to shorten to a greater extent during landing in order to reduce the angle of attack of the wing 12. The strut is shown in its unloaded position in Fig. 5 in which the piston assembly 20 is bottomed upon the extended position stop of the cylinder and a total compression ratio of 65:1 is provided with a 2:1 compression ratio in the static condition and a total of a 20" stroke, in the same modification of the device as described above. The condition of the strut when fully compressed is shown in Fig. 4 in which the piston is positioned against the head fitting at the top of the cylinder 19 at the end of the longer and softer stroke provided by this strut in the landing and taxiing conditions.

Referring now to Fig. 6, and assuming that a further load is applied to the wheels 18W tending to further compress the strut, the piston assembly will be caused to move upwardly and telescope within the lining 19a of the cylinder 19. The oil within the chamber 35, as well as that in the chamber 36 above the floating piston 23, being in communication through the orifices 22b, will be caused to be discharged upwardly through the metering orifice 21a around the metering pin 22. The oil discharged upwardly around the metering pin and through the orifice 21a passes into the central chamber 33 from which it also passes laterally outwardly through the openings 21b in the tube 21 and into the outer chamber 34. The nitrogen or other gas above the oil in the chamber 34 is correspondingly compressed as well, as also within the head chamber 32 opened to the chamber 33 through the axial orifice 21d at the top of the tube 21. The volume of oil above the floating piston 23 within the chamber 36 is also in fluid communication with the chamber 33 through the central opening within the metering tube 22 and the orifice at the bottom thereof at 22a. When the floating piston 23 is lowered, the volume or capacity of the chamber 36 is increased and the oil within the strut in the chambers 33, 34 and 35 will drop downwardly either externally of the metering tube 22 and through the orifice 21a, or internally thereof through the central opening 22a. The drain valve 23a at the lower portion of the floating piston 23, which is substantially conically shaped with the valve at its downwardly pointing apex, is normally closed such that a definite separation is provided between the hydraulic fluid within the chamber 24 and the shock absorber oil or fluid in the working portion of the strut. The pressures and compression ratios referred to above are by way of illustration and example only and the application of the principles of the present invention are not limited thereto. In the modification which has been illustrated the steering system is preferably automatically disconnected at the start of the landing gear retraction and a centering switch or like means is preferably provided in the gear retraction circuit to prevent retraction until the gear and wheels are in the centered position.

When the strut 18 is adjusted so as to support the airplane at the proper angle of attack for take-off, the floating piston 23 is forced to the top of the auxiliary chamber 24 by the hydraulic system pressure admitted through the valve 30. This position of the floating piston 23 limits the working volume of the strut to the space within the outer cylinder assembly 19 and the piston or inner cylinder 20 exclusive of the auxiliary chamber 24. At this adjustment the strut 18 when fully loaded assumes its maximum length under full load compression, which in a typical example is approximately five feet. To adjust the strut so as to support the airplane at the proper angle of attack for landing the floating piston 23 is allowed to move to the bottom of the auxiliary chamber 24 by relieving the pressure below the floating piston 23 to the hydraulic system reservoir 26. This increases the working volume and lowers the internal pressure at the five foot length and allows the strut to shorten some eight inches shorter than that length when fully loaded.

Other forms and modifications of the present invention which will occur to those skilled in the art after reading the foregoing description, are intended to come within the scope and spirit of this invention, as more particularly set forth in the appended claim.

We claim:

In a variable compression shock absorbing strut comprising an outer cylinder assembly, a wheel-carrying piston assembly slidably reciprocable within said outer cylinder assembly, and a shock absorbing media interposed in a main fluid chamber between said assemblies resiliently opposing reciprocable movement therebetween, the improvement wherein said piston assembly includes an apertured piston face and a secondary fluid chamber, said piston assembly including a free piston slidable within and dividing said secondary chamber into a first portion in communication with a fluid pressure source externally of said strut and a second chamber portion, an orifice tube supported from said outer cylinder assembly and having a transverse orificed diaphragm disposed within said main chamber opposed to said apertured piston face, a metering pin carried upon said piston face having a central passage fluidly interconnecting said main and secondary chambers, said metering pin aligned with said tube orifice for metering said shock absorbing media through said orifice upon relative movement of said assemblies, said shock absorbing media in communication with said second chamber portion through said apertured piston face, and fluid-actuated means carried by said piston assembly in communication with said first chamber portion for selectively moving said free piston for compressing said shock absorbing media for varying the shock absorbing characteristics of said shock absorbing strut.

References Cited in the file of this patent

UNITED STATES PATENTS

| 2,248,836 | Wallace | July 8, 1941 |
| 2,324,281 | Cowey | July 13, 1943 |
| 2,462,992 | Parker | Mar. 1, 1949 |
| 2,535,167 | Smith | Dec. 26, 1950 |
| 2,543,233 | Dowty | Feb. 27, 1951 |
| 2,554,581 | Levy | May 29, 1951 |
| 2,698,751 | Nye et al. | Jan. 4, 1955 |
| 2,735,634 | Fosness | Feb. 21, 1956 |